United States Patent Office 3,328,378
Patented June 27, 1967

3,328,378
METHOD FOR POLYMERIZING UNSATURATED
ORGANIC COMPOUNDS
Gottfried Pickarski and Rudolf Strasser Burghausen,
Bavaria, Germany, assignors to Wacker-Chemie
G.m.b.H., Munich, Bavaria, Germany
No Drawing. Filed Apr. 9, 1962, Ser. No. 185,854
Claims priority, application Germany, May 17, 1961,
W 30,011
18 Claims. (Cl. 260—94.9)

This invention relates to a novel catalyst system employed in the polymerization of unsaturated organic compounds, particularly olefins, and to a method for carrying out such a polymerization.

It is the object of this invention to introduce a novel catalyst system for use in the polymerization of olefins. An olefinic polymerization catalyst system which can be prepared rapidly and easily is also an object. A further object is a method of polymerizing olefins to produce high quality polymers in high yield. These and other objects and advantages of this invention are set forth in detail in or are apparent from the disclosure and claims following.

The catalyst system of this invention consists essentially of the reaction product of (1) one or more silanes of the general formula $H_nSiR_{4-n}$, wherein each R is a monovalent radical selected from hydrocarbon radicals, halogenohydrocarbon radicals, hydrocarbonoxy radicals and halogenohydrocarbonoxy radicals and $n$ is a positive integer less than 5, (2) a compound of a metal selected from Ti, Zr, Hf, Th, V, Cb (or Nb), Ta, Pa, Cr, Mo, W, U, Fe, Ru, Os Co Rh Ir Ni, Pd and Pt (i.e. metals of groups IVB, VB, VIB, VIIB and VIII from the Periodic Chart of the Elements, published by Fisher Scientific Co., see pages 448–449 of "Handbook of Chemistry and Physics," 40th ed., Chemical Rubber Publishing Co.), and (3) a compound selected from halides, oxyhalides, alkoxides, alkoxy halides, aryloxides and aryloxy halides of B, Al, Ga, In and Tl (metals of Group III in Periodic Chart of Elements identified above). The reaction can be carried forward in inert organic solvents if desired.

The silanes employed herein have 1 to 4 hydrogen atoms bonded directly to silicon, hence can be of the formulae $HSiR_3$, $H_2SiR_2$, $H_3SiR$ and $H_4Si$. The substituents represented by R can be organic radicals bonded directly to silicon by C—Si linkage or through oxygen atoms by C—O—Si linkage. The monovalent hydrocarbon radicals represented by R include alkyl radicals such as methyl, ethyl, isopropyl, tert-butyl, 2-ethylhexyl, dodecyl, octadecyl and myricyl; alkenyl radicals such as vinyl, allyl, decenyl and hexadienyl; cycloalkyl radicals such as cyclohexyl, cyclopentyl and cyclobutyl; cycloalkenyl radicals such as cyclopentenyl, cyclohexenyl and cyclo-2,4-hexadienyl; aryl radicals such as phenyl, naphthyl and xenyl; aralkyl radicals such as benzyl, phenylethyl and xylyl; and alkaryl radicals such as tolyl and dimethylphenyl. Halogenated derivatives of the monovalent hydrocarbon radicals listed above are also represented by R and are exemplified by chloromethyl, 3,3,3-trifluoropropyl, 3,3,4,4, 5,5,5-heptafluoropentyl, perchlorophenyl, 3,4-dibromocyclohexyl, $\alpha,\beta,\beta$-trifluorotolyl, $\alpha,\beta,\beta$-trifluoro-$\alpha$-chlorocyclobutyl, 2,4-dibromobenzyl, difluoromonochlorovinyl, chloroethyl and 2-iodocyclopenten-3-yl radicals. The radicals listed above can be bonded to silicon through oxygen atoms (C—O—Si linkages). Thus R can represent, monovalent hydrocarbonoxy radicals such as alkoxy, alkenyloxy, cycloalkoxy, cycloalkenyloxy, aryloxy, alkaryloxy and aralkoxy radicals particularly methoxy, ethoxy and phenoxy radicals, as well as halogenated derivatives of such hydrocarbonoxy radicals such as chloromethoxy, fluoroethoxy and bromophenoxy radicals.

The silanes employed herein can have from one to four hydrogen atoms per silicon atom, the balance of the substituents being R radicals as described above. The R radicals in any one silane molecule can be the same or different radicals and mixtures of molecular types can be employed. It is preferred to employ silanes which are fluid at room temperature and atmospheric pressure or are fluid at the reaction temperature and pressure employed. A list of typically useful silanes includes diphenylsilane, methylphenylsilane, phenylsilane, 1,3,5-trichlorophenylsilane, triethoxysilane, methylsilane, dimethylsilane, ethylsilane, vinylsilane, vinylmethylsilane, methylethoxysilane, dipropylsilane and methylisobutylsilane. Methods of preparing such silanes are well known in the art. A particularly advantageous method for preparing such silanes is described in Canadian Patent No. 596,259, issued Apr. 12, 1960, disclosing the reaction of corresponding halogenosilanes with alkali metal hydrides in the presence of catalytic quantities of hydrides, alkyls, alkoxides, phenoxides or chlorides of boron, gallium or aluminum.

The compounds of metals of groups IV–B, V–B, VI–B, VII–B and VIII of the Periodic Chart include the halides, oxyhalides, oxyhaloalkoxides, alcoholates, acetates, acetyl acetonates and halogenometallo organic cyclopentadienyl compounds. Specific examples of compounds operable as ingredient (2) herein include $TiCl_4$, $TiCl_3$, $ZrCl_4$, $VCl_4$, $CrCl_3$, $MoCl_5$, $HfCl_4$, $WCl_5$, iron halides, cobalt halides, $NbCl_5$, $NbBr_5$, $TaCl_5$ $RuCl_3$, $RuF_5$, $OsCl_2$, $OsCl_3$, $OsCl_4$, $RhCl_3$, $IrCl_2$, $IrCl_3$, $IrCl_4$, $IrI_3$, $NiCl_2$, $PdBr_2$, $PdCl_2$, $PdF_3$, $PtCl_2$, $PtCl_3$, $PtCl_4$, $MnCl_2$, $MnCl_3$, rhenium chlorides, isopropoxy titanium trichloride, zirconium oxychloride, vanadium oxytrichloride, chromium oxychloride, tungsten oxychlorides, $NbOCl_3$, vanadium oxychloride alkoxides, molybdenum alkoxy chlorides, titanium tetrabutylate, titanium tetra-(2-ethylhexylate), titanium tetraoctylate, zirconium tetrabutylate, zirconium tetracyclohexylate, zirconium tetra-(3-methylcyclohexylate), zirconium tetra-(2-phenylethylate), thorium tetra-t-butylate, titanium dichlorodiacetate, zirconium tetraacetate, nickel and manganese acetates, zirconium, thorium, cobalt and chromium acetylacetonates, mono- and dichloro-bis-(cyclopentadienyl) compounds of titanium, zirconium, vanadium, and chromium and cyclopentadienyl titanium trihalides.

The metallic compounds listed above can be employed singly or in mixtures. It may be preferred to use mixtures of such compounds to increase yield and/or quality of the final product. The metal can be present in its highest valency or any of its lower valency levels. It is often advisable to use mixtures of compounds wherein one metal occurs at different valency levels as in mixtures of $TiCl_4$ and $TiCl_3$ or $VOCl_3$ and $VCl_4$. Such mixtures may prove to be more active and produce higher molecular weight polymeric products.

The metallic compound or groups IV–B, V–B, VI–B, VII–B and VIII is employed in quantity of .02 to 2.0 mols per mol of silane employed. Best results are achieved within the range .05 to 0.5 mol metallic compound per mol of silane.

The third ingredient in the catalyst reaction mass is a compound of boron, aluminum, gallium, indium or thallium (group III of the Periodic Chart of Elements). The preferred compounds of group III elements are Friedel-Crafts type such as aluminum chloride, aluminum bromide, aluminum isopropoxydichloride, gallium, trichloride and boron trifluoride. Also suitable are aluminum butoxide, aluminum ethoxide, aluminum propoxide, aluminum phenoxide, monophenoxy aluminum dichloride, aluminum oxyhalides, boron tribromide, boron trichloride, boron oxychloride, $(CH_3O)_4B_2$, $B(OC_2H_5)_3$, $B(OC_4H_9)_3$, $B(OC_3H_7)_3$, diethoxy boron chloride, ethoxy boron dichloride, methoxy boron dichloride, $B(OC_6H_5)_3$, $GaBr_3$, $GaCl_2$, $GaCl_3$, $GaOCl$, $(CH_3O)_3Ga$, diethoxy gallium chloride, gallium phenoxide, phenoxy boron dichloride, diphenoxy gallium chloride, $InBr$, $InBr_2$, $InBr_3$, $InCl$, $InCl_2$, $InCl_3$, $TlBr$, $TlBr_3$, $TlCl$, $TlCl_3$, $TlOCH_3$, $[TlOC_2H_5]_4$, $TlOPh$, $Al(OR')_4Al_2Cl_5$ where $R'$ is an aliphatic radical such as methyl and ethyl and trialkylsiloxy aluminum dihalides such as $R_3'SiOAlCl_2$. Addition compounds of the foregoing compounds with alkyl halides such as $CH_3Br$ and $C_2H_5Cl$ can also be employed. Finally, commercially available addition compounds of $AlCl_3TiCl_3$ are also suitable herein.

The compounds of group III elements are employed in quantities of from .001 to 5 mols, and preferably .01 to .5 mol, of group III compound per mol of silane. The presence of the group III compound in the catalyst reaction mass materially accelerates the formation of the catalyst, greatly increases the yield of catalyst, produces a catalyst of high activity (space/time yield at equal catalyst quantity) particularly toward ethylene and α-olefins, and the quality of the polymeric products achieved with the catalyst is improved.

In preparing the catalyst systems from the three classes of ingredients noted above, the silane (1), metal compound of groups IV–B, V–B, VI–B, VII–B and VIII (2), and metal compound of group III–A (3) are mixed. It is preferred to exclude oxygen and water from the reaction zone and to carry out the reaction in an organic solvent. It is preferred to heat the reactants to increase the rate of reaction. A particularly useful mode of operation is (A) to mix the metal compounds (2) and (3) in a relatively small proportion of inert organic solvents at 20°–150° C. or to the boiling point of the fluid, preferably 50°–100° C. for 30–60 minutes. Subsequently (B) the silane component is added and the mass is further heated at 30°–200° C., preferably 50°–100° C., for less than 30 minutes. Generally, the catalyst formation is considered to be substantially completed when the heterogeneous complex being formed no longer increases in quantity. The duration of the two phases of reaction (A and B) is generally less than 2 hours. However, it may be expedient to link the catalyst formation from the metal compounds and the silanes directly to the polymerization, i.e. react the catalyst ingredients in the presence of the monomer to be polymerized.

The catalyst system can be further activated to produce higher molecular weight polymers exhibiting a high degree of crystallinity by removing soluble halogen-containing components such as chlorosilane from the catalyst mass. Further improvement can be accomplished by heat aging the catalyst and the catalyst can be further activated by adding fresh silane from time to time. This activation can also be effected by addition of further amounts of the above described compounds of group III–A of the Periodic Chart of Elements. The additional amounts of silane and the last mentioned compounds are equal to or smaller than the amounts of the said substances, as employed originally for the preparation of the catalyst.

The organic solvents employed during the preparation of the catalyst and during the polymerization reaction are inert auxiliary fluids commonly employed in polymerization or unsaturated organic compounds in the presence of coordination or complex catalysts. Examples of such solvents which are fluid at room temperature and atmospheric pressure include saturated aliphatic hydrocarbons such as n-pentane, n-hexane, n-heptane, undecane, isooctane and ligroin; cycloaliphatic hydrocarbons such as cyclohexane, cyclopentane and cycloheptane; aromatic hydrocarbons such as benzene, xylene, toluene, ethyl benzene and cumene; and halogenated aliphatic and aromatic hydrocarbons such as isopropyl chloride, ethyl bromide, methylene dichloride, isobutyl chloride, butyl bromide, chlorobenzene, bromobenzene, chlorotoluene, dichlorobenzene, iodobenzene, dibromobenzene, ethylene dichloride, propylene dichloride and trichlorethylene. When the polymerization reaction is to be carried forward uder superatmospheric pressure, low boiling hydrocarbons such as propane and butane can be employed. Mixtures of organic solvents are often employed to advantage. The organic solvent employed is preferably free of moisture, absorbed air, sulfur and oxygen containing compounds and other impurities.

The smallest practical quantity of organic solvent should be used. The amount employed should merely be sufficient to distribute the reaction components and disperse the reaction heat.

When the reactants employed are fluid under the conditions of reaction, the organic solvent is not required and can be omitted with advantage.

The catalysts prepared in accordance with this invention are decomposed or dissolved by aliphatic alcohols such as methanol, ethanol, isopropanol and n-butanol as well as in ketones such as acetone and methylethylketone. Thus a very pure polymeric product can be obtained by washing the polymerization reaction mass with an aliphatic alcohol or a ketone to remove the catalyst from the polymer.

In accordance with this invention, a wide variety of unsaturated aliphatic hydrocarbon monomers can be polymerized. The catalysts are particularly useful in polymerizing ethylene and propylene but are also useful in polymerizing other α-olefins, aliphatic vinyl compounds, acrylic acid derivatives, vinyl aromatic compounds, vinyl-cycloaliphatic compounds, diolefins, cyclic olefins, and so forth. Specific examples of polymerizable organic monomers include isobutylene, 1-butenes, butadiene, styrene, tetra-fluoroethylene, 1-hexanes, 1-octenes, butene-2, pentene-2, hexene-2, heptene-3, 2-methylbutene-1, 2-methylhexene-1, 2-ethylheptene-1, 1,5-hexadiene, 1,4-pentadiene, 1,4,7-octatriene, cyclohexene, isoprene, 2,3-dimethylbutadiene, 2-methoxybutadiene, 2-phenylbutadiene, acrylonitrile, methyl acrylate, methyl methacrylate, vinyl chloride, 2-methyl-5-vinyl pyridine, 2-vinyl pyridine, vinyl acetate, 4-methylpentene-1, 4,4-dimethylpentene-1, dodecene-1, vinyl cyclohexane as well as mixtures such as petroleum refinery streams including refinery ethylene fraction, propylene fraction, ethylene-propylene fraction and butylene fraction. Mixtures of monomers are frequently employed in this invention.

The polymerization reaction can be carried out continuously or batch-wise as desired. The reaction conditions can be varied over a wide range. Pressures from atmospheric to 40–50 atmospheres or higher can be employed. Temperatures between 30° and 200° C. are usually sufficient for the polymerization reaction and a reaction temperature of 50° to 150° C. is preferred.

The following examples are included in this application to assist those skilled in the art in understanding and practicing this invention. The scope of the invention is delineated in the claims and is not limited by the examples. All parts and percentages in the examples are based on weight unless otherwise specified. All temperatures are measured on the centigrade scale. The paraffin hydrocarbon solvent employed in the examples has a boiling range of 110°–135° C. and can be replaced by any of the inert organic solvents described above.

*Example 1*

500 mg. of technical $AlCl_3$ and 2 ml. $TiCl_4$ were stirred together under dry nitrogen with 70 ml. paraffin hydrocarbon solvent for 20 minutes at 80° C. A solution of 3 ml. diphenylsilane (B.P.$_{0.5}$ 94°–95°) in 30 ml. of said paraffin hydrocarbon was slowly added at 80°. A dark brown precipitate formed immediately. The precipitate was increased in quantity by subsequently heating to 85° for ½ hour. It was diluted with one liter of the paraffin hydrocarbon and the nitrogen gas barrier was replaced by ethylene which was passed through the agitated suspension of the precipitate in the paraffin hydrocarbon. An exothermic polymer formation was immediately observed. The polymerization temperature was 90°.

The ethylene absorption began to decrease noticeably when the polymerization deposit, based on the polymer product formed, became difficult to stir. The polymerization time was 3 hours. After the addition of 10 ml. butanol which released the catalyst, filtration and washing with the paraffin hydrocarbon solvent and drying, a yield of 120 g. of white polyethylene powder with an ash content of 0.04% was obtained. The product displayed only small quantities of low molecular constituents (less than 0.05%) extractable with acetone. The density of 0.960 revealed that a highly crystalline, rigid polyethylene had been produced.

*Example 2*

A catalyst was prepared as described in Example 1, operating, however, under an ethylene gas barrier from the beginning and by passing ethylene through the reaction mixture after adding the silane. 137.5 g. of dry polyethylene powder were obtained under the ethylene polymerization conditions set forth in Example 1.

*Example 3*

The catalyst preparation of Example 1 was repeated except the $AlCl_3$–$TiCl_4$ mixture in paraffin hydrocarbon solvent was heated 5 min./80°, the silane-solvent mixture was added and further heating was carried out for 15 min./70°. The polymerization of the ethylene was carried out at temperatures of 95°–100°, and a yield of 128.5 g. of a white very fine-kernelled polyethylene powder was obtained with properties which were essentially the same as those of the polyethylene of Example 1 with the exception of a somewhat higher density of 0.963.

*Example 4*

100 mg. of $AlCl_3$, 1.5 g. $TiCl_3$ and 0.5 ml. $TiCl_4$ were heated to 85° in 100 ml. paraffin hydrocarbon for 30 min. under dry nitrogen while stirring. 3 ml. of trichlorophenylsilane were added dropwise and the mixture was heated for another 30 min. to 85°. A dark brown to dark violet material was formed. The catalyst mass was placed in a 1-liter pressure vessel together with more of the paraffin hydrocarbon. The pressure vessel was closed and ethylene was forced into the vessel. The vessel was heated at 105° and a pressure of 25 at. to polymerize the ethylene. After processing the polymer as in Example 1, 180 g. of a very tough and high molecular polyethylene with a density of 0.958 were obtained with good volume/time yield.

*Example 5*

A mixture of 100 ml. of the paraffin hydrocarbon, 180 mg. powdered $AlCl_3$ and 1.5 g. $TiCl_3$ was heated to 80° in a 1-liter stirred autoclave under a propylene barrier; 5 ml. of diphenylsilane, dissolved in 20 ml. of the paraffin hydrocarbon were slowly added, and the mixture kept at 75° for 30 minutes while stirring. After cooling, 350 ml. of fluid and dried propylene were forced in. The polymerization was carried out at 130°–140°. To maintain the pressure, 100 ml. of propylene were forced in in to the reaction vessel. After blowing off the remaining propylene residue (3 at.) and after decomposing the catalyst with 15 ml. isopropyl alcohol, a solid polymer mass was obtained from which a high crystalline polypropylene with a melting point of 160.5° was isolated with a good yield after extraction with boiling heptane.

*Example 6*

The procedure described in Example 5 was repeated using gaseous methyl silane in place of the diphenylsilane. The yield of polypropylene with a melting point of 159° obtained was very good. Oligomeric polypropylene and low molecular, tacky polymeric constituents may be found in the organic solvent used and in the heptane extract.

*Example 7*

A mixture of 600 mg. $AlCl_3$, 1 ml. $VCl_4$ and 0.5 ml. $TiCl_4$ was heated in 60 ml. paraffin hydrocarbon to 80° under an ethylene gas barrier and 3 ml. triisobutoxysilane was then added. Catalyst formation began immediately and after 30 min. at 78° a black-brown suspension had been formed. After diluting with 1 liter of the paraffin hydrocarbon solvent, ethylene was introduced into the mass and polymerized at 88° under vigorous stirring. After releasing the catalyst and processing as in Example 1, a yield of 95 g. of a very high molecular weight, tough polyethylene was obtained after drying; melting point: (polarizing microscope) 129°.

*Example 8*

A mixture of 100 ml. benzine (boiling range of 100°–135°), 1.5 ml. $TiCl_4$ and 1 g. subl. $AlCl_3$ was placed in a 1-liter stirring autoclave under an ethylene barrier. The mass was heated for one hour at 85° while stirring, and ethylene was introduced through a reflux cooler. After cooling to 22°, 12 g. of $SiH_4$ was forced in (resulting pressure 13 at.). The ethylene was polymerized directly at a constant pressure of 22.5 at. for 1½ hours at 85°–90° while forcing in $[SiH_4]$ a number of times. After blowing off the residual ethylene and decomposing the catalyst with a small amount of isopropyl alcohol, a solid polymer block was obtained, yielding 45.5 g. highly crystalline polyethylene powder after the customary processing as in Example 7. The polyethylene had a melting point of 129.5°, ash content 0.04%.

A control attempt at polymerization without using the $AlCl_3$ yielded only 18.1 g. of polyethylene powder with an ash content of 1.79% during the same time with no other change in conditions or technique.

*Example 9*

There were placed into a 1-liter stirring autoclave in the following succession and under propylene barrier: 200 ml. gasoline (B.P. 100–135° C.), 10 ml. phenylmethyl silane, 1.5 g. $TiCl_3$, 200 mg. $AlCl_3$ and 350 ml. fluid propylene. After heating to 45° the resulting pressure was 17.5 at. which sank to 8 at. during the passage of 5 hours. After decomposing the catalyst and extracting the polymer product with boiling heptane while recovering the residual propylene gas, 55 g. of a solid, white polypropylene powder were obtained, M.P. (polarizing microscope) 158°, ash content 0.021%; the $\eta_{sp}/c$ (0.1% B. Wt. solution in tetraphydronaphthaline at 135°) is 12. The polypropylene can be pressed into almost clear, very tough and solid plates, melting index (5 kg.): 0.4. The isotactic portion is ca. 80% (from IR Spektren, J. P. Luongo, J. of Appl. Polymer Sci., vol. III, No. 9, 302–309 (1960)). In addition to the high crystalline polypropylene, 40 g. of essentially amorphous polypropylene were isolated from the heptane extract, 15.1 g. of oily polymerizate from the filtrates.

An analogous attempt at polymerization using a methyl hydrogen polysiloxane catalyst, $TiCl_4/VOCl_3$ and $AlCl_3$ resulted in similar yields but the polypropylene showed an ash content of 1.79%, a $\eta_{sp}/c$ of 2.74 and very brittle press plates.

*Example 10*

Excellent yields of polyethylene exhibiting high molecular weight and low ash content were achieved when the method of Example 1 was repeated employing a chloride of Zr, Cr, Hf, W, Fe, Co, Nb, Ta, Ru, Os, Rh, Ir, Ni, Pd, Pt, Mn or Re in place of the $TiCl_4$.

*Example 11*

Excellent yields of high grade polyethylene were obtained when the method of Example 7 was repeated employing oxychlorides of Ti, Zr, Cr, U, Nb and W, oxychloromethoxides and oxychloroethoxides of Ti, Zr, U and Mo, alcoholates of Ti, Zr and Th, acetates of Ti, Zr, Ni and Mn or oxychloroethoxides of Ti, U and Mo in place of the VCl₄.

*Example 12*

Excellent yields of high grade polypropylene were obtained when the method of Example 5 was repeated employing AlBr₃, BCl₃, GaCl₂, GaCl₃, InBr₂, TlCl, TlCl₃, GaOCl, aluminum oxychloride, aluminum butoxide, isopropoxy aluminum dichloride, aluminum phenoxide, phenoxy aluminum dichloride, B(OC₆H₅)₃, (C₂H₅O)₂BCl, C₂H₅OBCl₂, CH₃OBCl₂, (CH₃O)₄B₂, B(OC₄H₉)₃, TlOCH₃, TlOC₆H₅ or [TlOC₂H₅]₄ in place of the AlCl₃.

*Example 13*

Excellent high molecular weight polymers were achieved when the method of Example 1 was repeated employing isobutylene,
1-butene,
butadiene styrene,
chlorotrifluoroethylene,
heptene-3,
2-methylhexene-1,
1,4,7-octatriene,
cyclohexene,
2,3-dimethylbutadiene,
2-phenylbutadiene,
acrylonitrile,
methyl methacrylate,
vinyl chloride,
2-methyl-5-vinyl pyridine or vinyl acetate in place of the ethylene.

The foregoing examples can be repeated with similar results with other organohydrogensilanes and with other inert organic solvents as noted previously.

*Example 14*

100 ml. paraffin hydrocarbon, 4 ml. TiCl₄ and 0.5 g. AlCl₃ were stirred together for 15 minutes at 85° C. under an ethylene gas barrier in a glass vessel furnished with a stirrer and a thermometer. After cooling to 50° and after replacing the ethylene by nitrogen 3 ml. VOCl₃ and 10 ml. diphenylsilane were added and the mixture was stirred for 1 hour at 90° C. After cooling to room temperature, filtration and repeated washing with the paraffin hydrocarbon one third of the almost black powder was mixed with 150 ml. paraffin hydrocarbon and 5 ml. diphenylsilane and placed into an 1-liter stirred autoclave. 350 ml. fluid propylene were forced into the autoclave and polymerized for 4 hours at 55° C. After processing as described above 60 g. polypropylene were obtained, from which 20 g. of a high crystalline product with a melting point of 160.55 were isolated after extraction with boiling heptane.

*Example 15*

50 ml. paraffin hydrocarbon, 10 ml. methylisobutylsilane (boiling at 73° to 74° at 725 mm. Hg pressure, $n_D^{20°\ c.}$ 1.3963), 0.3 g. AlCl₃, 3 ml. TiCl₄ and 2.5 ml. VOCL₃ were stirred together in a glass vessel under a nitrogen barrier. The mixture was heated for 1 hour at 90°, cooled, filtered and washed with the paraffin hydrocarbon. Paraffin hydrocarbon was added to the washed product to give 100 ml. of a suspension. One half of this suspension was stirred into an 1-liter autoclave with 5 ml. methylisobutylsilane, 0.2 g. AlCl₃ and 350 ml. fluid propylene for 4 hours at 60° C. After processing 75 g. polypropylene were obtained, from which 25 g. were insoluble in boiling heptane and had a melting point of 164.5° C.

That which is claimed is:

1. The method of preparing a catalyst system adapted for use in the polymerization of unsaturated organic compounds consisting essentially of reacting at a temperature of 20°–200° C., (1) at least one silane of the general formula $H_nSiR_{4-n}$ where each R is a monovalent radical selected from the group consisting of hydrocarbon radicals, halogenohydrocarbon radicals, hydrocarbonoxy radicals and halogenohydrocarbonoxy radicals and $n$ is an integer from 1 to 4 inclusive, (2) .02 to 2.0 mols per mol of silane of at least one metallic compound selected from the group consisting of halides, oxyhalides, oxyhaloalkoxides, alcoholates, acetates, acetylacetonates and halogenometallo organic cyclopentadienyl compounds of Ti, Zr, Hf, Th, V, Nb, Ta, Pa, Cr, Mo, W, U, Mn, Re, Fe, Ru, Os, Co, Rh, Ir, No, Pd and Pt, and (3) .001 to 5.0 mol of silane of at least one compound selected from the group consisting of halides, oxyhalides, alkoxides, alkoxy halides, aryloxides, and aryloxy halides of B, Al, Ga, In and Tl.

2. The method of claim 1 wherein the silane is selected from the group consisting of diphenylsilane, methylphenylsilane, 1,3,5-trichlorophenylsilane, methylsilane, triisobutoxysilane, dipropylsilane, methylisobutylsilane, and SiH₄.

3. The method of claim 1 wherein the metallic compound (2) is at least one chloride of titanium.

4. The method of claim 1 wherein the metallic compound (2) is at least one chloride of vanadium.

5. The method of claim 1 wherein the metallic compound (2) is at least one oxychloride of vanadium.

6. The method of claim 1 wherein the compound (3) is a chloride of aluminum.

7. The method of claim 1 wherein the compound (3) is a bromide of aluminum.

8. The method of preparing a catalyst system adapted for use in the polymerization of unsaturated organic compounds consisting essentially of (A) heating within the range of 20° to 200° C. a mixture of (2) a metal chloride wherein the metallic ion is selected from the group consisting of metals of groups IVB, VB, VIB, VIIB and VIII of the Periodic Chart of elements and (3) an aluminum halide, (B) adding (1) a silane of the general formula $H_nSiR_{4-n}$ wherein each R is a monovalent hydrocarbon radical and $n$ is an integer of from 1 to 4 inclusive, and thereafter (C) heating the reaction mass within the range 20° to 200° C. inclusive.

9. The method of claim 8 wherein the heating step (C) is carried out in the presence of a monomeric aliphatically unsaturated organic compound.

10. In the method of polymerizing monomeric aliphatically unsaturated organic compounds the improvement consisting essentially of employing a catalyst system prepared by reacting at a temperature in the range 20° to 200° C. (1) at least one silane of the general formula $H_nSiR_{4-n}$ where each R is a monovalent radical selected from the group consisting of hydrocarbon radicals, halogenohydrocarbon radicals, hydrocarbonoxy radicals and halogenohydrocarbonoxy radicals and $n$ is an integer from 1 to 4 inclusive, (2) .02 to 2.0 mols per mol of silane of at least one metallic compound selected from the group consisting of halides, oxyhalides, oxyhaloalkoxides, alcoholates, acetates, acetylacetonates and halogenometallo organic cyclopentadienyl compounds of Ti, Zr, Hf, Th, V, Nb, Ta, Pa, Cr, Mo, W, U, Mn, Re, Fe, Ru, Os, Co, Rh, Ir, Ni, Pd and Pt, and (3) .001 to 5.0 mols per mol of silane of at least one compound selected from the group consisting of halides, oxyhalides, alkoxides, alkoxy halides, aryloxides, and aryloxy halides of B, Al, Ga, In and Tl.

11. The method of polymerizing an aliphatically unsaturated organic monomer consisting esesntially of (I) reacting at a temperature of 20° to 200° C. (1) at least one silane of the general formula $H_nSiR_{4-n}$ wherein each R is a monovalent hydrocarbon radical, (2) .01 to 0.5 mol per mol of silane of at least one metallic compound selected from the group consisting of halides, oxyhalides, oxyhaloalkoxides, alcoholates, acetates, acetylacetonates and halogenometallo organic cyclopentadienyl compounds of metals of side groups IV–B, V–B, VI–B, VII–B and VIII of the periodic chart of elements, and (3) 0.05 to 0.5 mol per mol of silane of a compound selected from the group consisting of halides, oxyhalides, alkoxides, alkoxy halides, aryloxides, and aryloxy halides of B, Al, Ga, In and Tl, in the presence of an inert organic solvent and (II) contacting the reaction product of I with an aliphatically unsaturated organic monomer at a temperature in the range 30° to 200° C. and a pressure of atmospheric to 50 atmospheres, inclusive.

12. The method of claim 1 wherein the reaction is carried forward in an inert organic solvent.

13. The method of claim 11 wherein the aliphatically unsaturated organic monomer is selected from the group consisting of aliphatic vinyl compounds, acrylic acid derivatives, vinyl aromatic compounds, vinylcycloaliphatic compounds, diolefins, and cyclic olefins.

14. The method consisting essentially of heating at 50°–150° C. and atmospheric pressure and reacting (1) a silane selected from the group consisting of $$(C_6H_5)_2SiH_2$$

$Cl_3C_6H_2SiH_3$, $CH_3SiH_3$ (isobutoxy-)$_3$SiH, dipropylsilane, methylisobutylsilane and $SiH_4$, (2) $AlCl_3$, and (3) $TiCl_4$, in the presence of an inert saturated aliphatic hydrocarbon solvent which is fluid at room temperature and atmospheric pressure, and thereafter bubbling ethylene through the reaction mass at a temperature of 50° to 150° C. and separating the resulting polyethylene from the reaction mass.

15. A composition of matter consisting essentially of the reaction product of (1) at least one silane of the general formula $H_nSiR_{4-n}$ where each R is a monovalent radical selected from the group consisting of hydrocarbon radicals, halogenohydrocarbon radicals, hydrocarbonoxy radicals and halogenohydrocarbonoxy radicals and $n$ is an integer from 1 to 4 inclusive, (2) .02 to 2.0 mols per mol of silane of at least one metallic compound selected from the group consisting of halides, oxyhalides, oxyhaloalkoxides, alcoholates, acetates, acetylacetonates and halogenometallo organic cyclopentadienyl compounds of Ti, Zr, Hf, Th, V, Nb, Ta, Pa, Cr, Mo, W, U, Mn, Re, Fe, Ru, Os, Co, Rh, Ir, Ni, Pd and Pt, and (3) .001 to 5.0 mols per mol of silane of at least one compound selected from the group consisting of halides, oxyhalides, alkoxides, alkoxy halides, aryloxides, and aryloxy halides of B, Al, Ga, In and Tl.

16. The method of claim 8 wherein the heating step (A) is carried out in the presence of a monomeric aliphatically unsaturated organic compound.

17. The method of claim 8 wherein both the heating steps (A) and (C) are carried out in the presence of a monomeric aliphatically unsaturated organic compound.

18. The method of claim 11, wherein the polymerization is carried forward in an inert organic solvent, which is added.

References Cited

UNITED STATES PATENTS

| | | | |
|---|---|---|---|
| 3,001,951 | 9/1961 | Tornquist | 260—94.945 |
| 3,086,964 | 4/1963 | Joyner | 260—93.7 |

FOREIGN PATENTS

| | | |
|---|---|---|
| 553,839 | 6/1957 | Belgium. |
| 569,387 | 1/1959 | Belgium. |
| 785,314 | 10/1957 | Great Britain. |
| 889,829 | 2/1962 | Great Britain. |

OTHER REFERENCES

Freidlina et al.: Doklady Akad. Nauk, SSSR 137, 885–8; 1961.

JOSEPH L. SCHOFER, *Primary Examiner.*

F. DENSON, *Assistant Examiner.*